(12) United States Patent
Aoki et al.

(10) Patent No.: US 7,447,446 B2
(45) Date of Patent: Nov. 4, 2008

(54) LIGHT SOURCE APPARATUS, AND METHOD FOR SWITCHING REDUNDANCY OF THE LIGHT SOURCE

(75) Inventors: Yasuhiko Aoki, Kawasaki (JP);
Hideyuki Miyata, Kawasaki (JP);
Setsuo Yoshida, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/885,755

(22) Filed: Jul. 8, 2004

(65) Prior Publication Data

US 2005/0213972 A1    Sep. 29, 2005

(30) Foreign Application Priority Data

Mar. 29, 2004    (JP)    ............... 2004-096023

(51) Int. Cl.
*H04B 10/04*    (2006.01)
*H04B 10/12*    (2006.01)

(52) U.S. Cl. ................ 398/200; 398/91; 398/201

(58) Field of Classification Search .............. 398/91, 398/200, 201; 359/278
See application file for complete search history.

(56) References Cited

U.S. PATENT DOCUMENTS 6,081,355 A * 6/2000 Sharma et al. ............ 398/90
6,324,318 B1 11/2001 Suzuki ..................... 385/24
2001/0046344 A1 11/2001 Hayashi et al. ............ 385/15
2002/0191904 A1 * 12/2002 Kani et al. ................ 385/24
2003/0012495 A1 1/2003 Islam et al. ............... 385/31
2005/0163503 A1 * 7/2005 Lee et al. .................. 398/19

FOREIGN PATENT DOCUMENTS

JP    2002-319731    10/2002

OTHER PUBLICATIONS

European Search Report dated Dec. 21, 2005, in corresponding European Patent Application No. 04016462.6.

* cited by examiner

*Primary Examiner*—Shi K. Li
*Assistant Examiner*—Nathan M Curs
(74) *Attorney, Agent, or Firm*—Staas & Halsey LLP

(57) ABSTRACT

The present invention relates to a light source apparatus. The light source apparatus includes a plurality of optical pulse train generation sections; an optical switch section capable of selectively outputting an optical pulse train to be taken as an optical pulse train for current use; an output light generation section capable of generating continuous light of multiple wavelengths from said optical pulse train output from said optical switch section; and an optical switch control section for controlling said optical switch section to switch an output of said optical pulse train for current use from said optical switch section, in accordance with the states of respective optical pulse trains generated by said plurality of optical pulse train generation sections and without involvement of instantaneous power interruption.

14 Claims, 12 Drawing Sheets

DIFFERENCE IN PULSE TIMINGS

DELAY    DELAY

LIGHT SOURCE APPARATUS, AND METHOD FOR SWITCHING REDUNDANCY OF THE LIGHT SOURCE

BACKGROUND OF THE INVENTION

1) Field of the Invention

The present invention relates to a light source apparatus suitable for use in an optical communications system, as well as to a method for switching redundancy of the light source.

2) Description of the Related Art

In the field of optical communications systems, transmission capacity is increased through use of a Wavelength Division Multiplexing (WDM) technique. A semiconductor laser which emits a Continuous Wave (CW) of single wavelength has hitherto been widely employed as a signal source in a WDM system. With an increase in the number of channels, separate light sources must be provided in equal number to operational channels.

In order to implement a redundancy configuration for the case of occurrence of a failure in the light sources, a current light source and a backup light source must be provided for each working wavelength.

As mentioned above, constructing a WDM communications system through use of a light source which generates a single wavelength requires light sources which are equal in number to the operational channels. In order to fix the working wavelengths at channel intervals specified by the ITU-T (International Telecommunication Union-Telecommunication sector), temperature control and monitoring of a wavelength must be performed on a per-device basis.

In addition, in order to implement such a redundancy configuration through use of such a light source which generates a single wavelength, a redundancy configuration must be imparted to each of the light sources of respective wavelengths. Therefore, a footprint of the light sources and power consumed by the light sources become tremendous in association with an increase in the number of channels.

In a case where the redundancy configuration is implemented in the light source through use of the plurality of light sources provided in equal number to the operational channels, in the event that trouble has arisen in CW light (continuous light) generated from the respective light sources, a state in which no light is generated (a cutoff state) arises between a time when the trouble has been detected and a time when the switch is changed. Hence, a period of time during which the CW light is cut off is responsible for occurrence of a problem in communication, such as a transmission error.

Meanwhile, the super continuum light source, which is a technique for collectively generating an optical carrier ranging from hundreds of wavelengths to thousands of wavelengths, has recently been discussed. As compared with the light source, such as that described previously, which has a plurality of light sources in equal number to the operational channels, the SC light source involves simple temperature control. Further, with an increase in the number of channels, a footprint of the light sources and power consumed by the light sources do not become tremendous.

However, a redundancy configuration method for the case of occurrence of a trouble has not been put forward in relation to the SC light source. In a case where the WDM communications system is configured with the SC light sources, there is desired implementation of a redundancy configuration for making a switch to a backup light source system in the event that trouble has arisen in one light source system.

A technique described in Patent Document 1 provided below is available as a known technique relevant to the present invention. Patent Document 1 relates to an optical circuit which enables an improvement in product yield. Specifically, Patent Document 1 describes a multi-wavelength light source optical circuit into which are integrated a plurality of DFB lasers corresponding to optical elements.

[Patent Document 1]

Japanese Patent Laid-open2002-319731

However, the technique described in Patent Document 1 is intended for embodying a redundancy configuration for the case where the DFB lasers differ from each other in terms of an oscillation wavelength. Hence, the technique is not applicable to implementation of the redundancy configuration using the SC light sources, such as that mentioned previously.

SUMMARY OF THE INVENTION

The present invention has been conceived in light of the foregoing problem and provides a light source apparatus which enables switching from a current system to a backup system using an SC light source without involvement of instantaneous interruption of power, to thus avoid, e.g., interruption of CW light in the course of being output when switching is made to the backup system upon detection of a failure, as well as providing a method for switching redundancy of the light source apparatus.

To this end, a light source apparatus of the present invention is characterized by including a plurality of optical pulse train generation sections capable of generating periodic optical pulse trains in synchronism with each other; an optical switch section capable of selectively outputting an optical pulse train to be taken as an optical pulse train for current use from among the optical pulse trains output from the plurality of optical pulse train generation sections; an output light generation section capable of generating continuous light having a plurality of wavelengths from the optical pulse train output from the optical switch section; and an optical switch control section for controlling the optical switch section in order to switch an output of the optical pulse train for current use from the optical switch section, in accordance with the states of respective optical pulse trains generated by the plurality of optical pulse train generation sections and without involvement of instantaneous power interruption.

In the light source apparatus, the optical switch control section preferably further includes photoelectric conversion sections for converting into electrical signals the respective optical pulse trains output from the plurality of optical pulse train generation sections; an anomaly detection section for detecting anomalies in the respective optical pulse trains converted into electrical signals by the photoelectric conversion sections; a timing extraction section for extracting extinction/illumination timings of the respective optical pulse trains converted into the electrical signals by the photoelectric conversion sections; and the first control signal output section which, when the anomaly detection section has detected anomalies in the optical pulse train for current use, outputs the first control signal to the optical switch section in order to switch the optical pulse train for current use, at an extinction timing extracted by the timing extraction section.

Moreover, each of the plurality of optical pulse train generation sections may include a clock signal generation section for generating a clock signal, and a pulse light source for outputting optical pulse trains on the basis of the clock signal generated by the clock signal generation section. The light source apparatus may further include a sync control section for synchronously controlling the clock signal generation sections of the respective optical pulse train generation sections on the basis of extinction/illumination timings of the respective optical pulse trains extracted by the timing extraction section.

The light source apparatus may also further include node sections, each of which divides the respective optical pulse train output from the plurality of optical pulse train generation sections into two branches and which guides one of the branches to the optical switch section and the other branch to the respective photoelectric conversion section, and a light delay circuit can also be interposed between the node section and the optical switch section, the light delay circuit delaying propagation of the respective optical pulse trains.

Alternatively, the light source apparatus can also further include the node sections, each of which divides the respective optical pulse trains output from the plurality of optical pulse train generation sections into two branches and which guides one of the branches to the optical switch section and the other branch to the photoelectric conversion sections; light delay circuits each being interposed between the corresponding node section and the optical switch section and which delays propagation of the respective optical pulse train; and chirp compensation circuits, each of which is interposed between the respective node section and the optical switch section and which compensates for chirp.

In the previously-described light source apparatus, the optical switch section may further include first and second optical switches which are under control of the optical switch control section, receive optical pulse trains output from the plurality of optical pulse train generation sections, and can selectively output an optical pulse train for current use among the received optical pulse trains; and a switch-to-be-used changeover control section for controlling switching between the first optical switch and the second optical switch such that the first optical switch is used in normal times for selectively outputting the optical pulse train for current use and the second optical switch is used for selectively outputting another optical pulse train for current use in the event of occurrence of anomalies in the optical pulse train for current use output from the first optical switch.

In this case, the first and second optical switches each include a current optical pulse train output port for outputting the optical pulse train for current use among the plurality of optical pulse trains output from the optical pules train generation sections, and a backup optical pulse train output port for outputting a backup output pulse train other than the current optical pulse train, for monitoring purpose. The switch-to-be-used changeover control section may be configured to determine occurrence of anomalies in any one of the first and second optical switches, by means of monitoring the backup output pulse train output from the backup optical pulse train output ports of the respective first and second optical switches.

A light delay circuit may also be interposed between the first optical switch and the output light generation section for delaying propagation of an optical pulse train output from the first optical switch.

Alternatively, a light delay circuit for delaying propagation of an optical pulse train output from the first optical switch and a chirp compensation circuit for effecting chirp compensation may be interposed between the first optical switch and the output light generation section.

The light source apparatus may also further include a light phase adjustment section for compensating a difference between a time when respective optical pulse trains output from the plurality of optical pulse trains arrive at the first optical switch and a time when respective optical pulse trains output from the plurality of optical pulse trains arrive at the second optical switch.

In the light source apparatus, the optical switch control section may include a status determination section for determining the status of an optical pulse train output for current use from the optical switch section, on the basis of variations in a specific wavelength component in continuous light of multiple wavelengths generated as the output light by the output light generation section; and the second control signal output section for outputting the second control signal to the optical switch section in order to switch an output of the optical pulse train for current use from the optical switch section without involvement of instantaneous power interruption when the status determination section determines the status of the optical pulse train output for current use from the optical switch section to be anomalous.

A method for switching redundancy of a light source apparatus of the present invention is characterized by corresponding to a method for switching redundancy of a light source employing an output light generation section capable of generating continuous light of multiple wavelengths as output light from a periodic optical pulse train, the method including: using a plurality of optical pulse train generation sections capable of generating the optical pulse train; employing any one of the plurality of optical pulse train generation sections for current use and causing the output light generation section to generate the output light from the periodic optical pulse train output from the optical pulse train generation section for current use; and switching, among the plurality of optical pulse train generation sections, any of optical pulse train generation sections not having been employed for current use to an optical pulse train for current use without involvement of instantaneous power interruption at the time of switching of the optical pulse train generation section for current use, and causing the output light generation section to generate the output light from a periodic optical pulse train output from the optical pulse train generation section switched for current use.

In relation to the method for switching redundancy of a light source, in the event of occurrence of anomalies, any of optical pulse train generation sections not having been employed for current use among the plurality of optical pulse train generation sections is preferably switched to an optical pulse train for current use at an extinction timing of the optical pulse train, without involvement of instantaneous power interruption.

As mentioned above, according to the present invention, the optical switch control section is arranged to be able to switch the current system to the backup system through use of the SC light source without involvement of instantaneous interruption of power. Even in the event that, for instance, a failure has arisen in the optical pulse train generation section of the current system, the optical pulse train can be switched to another optical pulse train output from the optical pulse generation section of the backup system without involvement of instantaneous interruption of power, thereby yielding an advantage of the ability to stably generate and output continuous light which is to become output light.

Even when a failure has arisen in the first optical switch in use, the first optical switch can be changed to the second optical switch without instantaneous interruption of power, by means of the switch-to-be-used changeover control section along with the first and second optical switches. Hence, CW light (continuous light), which is to become output light, can be output more stably, thereby yielding another advantage of the ability to stabilize operation of the light source apparatus by leaps and bounds.

DESCRIPTION OF THE PREFERRED EMBODIMENTS

Embodiments of the present invention will be described hereinbelow by reference to the drawings.

[A] Description of the First Embodiment

Figure 1:
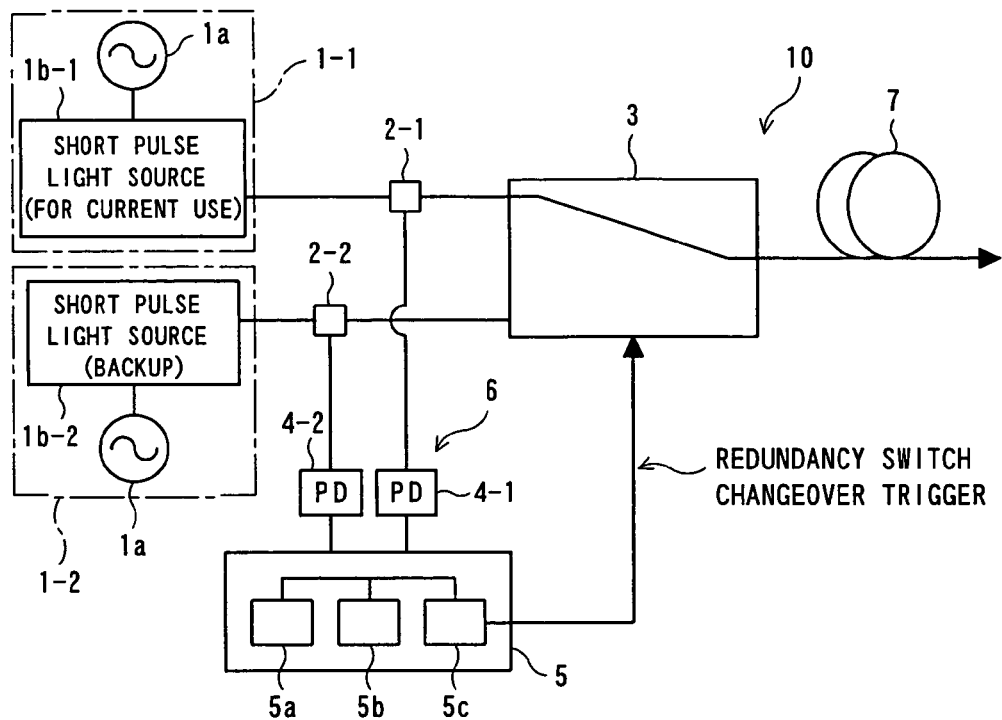
FIG. 1 is a block diagram showing a light source apparatus according to the first embodiment of the present invention.

FIG. 1 is a block diagram showing a light source apparatus according to the first embodiment of the present invention. A light source apparatus 10 shown in FIG. 1 comprises optical pulse train generation sections 1-1, 1-2; tap couplers 2-1, 2-2; an optical switch 3; an optical switch control section 6; and a high nonlinear fiber 7. The light source apparatus 10 acts as an SC light source and also switches the current system to a backup system without instantaneous interruption of power in the event of occurrence of a failure, thereby preventing CW light which is now output from entering a disconnected state.

The light source train generation sections 1-1, 1-2 can respectively generate periodic pulse trains in synchronism with each other. The optical pulse train generation section 1-1 comprises a pulse drive circuit 1a and a short pulse light source 1b-1, and the optical pulse train generation section 1-2 shares the pulse drive circuit 1a and comprises another short pulse light source 1b-2.

The pulse drive circuit 1a acts as a clock signal generation section for generating a clock signal (having a frequency of, e.g., 10 GHz or thereabouts) to be used for producing an optical pulse train. The optical pulse train generation sections 1-1, 1-2 use the single pulse drive circuit 1a in a shared manner, thereby generating synchronized optical pulse trains. Even when using separate pulse drive circuits, the pulse train generation sections 1-1, 1-2 can generate synchronized optical pulse trains, so long as they are provided with a circuit for bringing the separate pulse drive circuits in synchronism with each other as shown in, e.g., FIG. 9 which will be described later.

The short pulse light sources (pulse light sources) 1b-1, 1b-2 output optical pulse trains on the basis of a clock signal produced by the pulse drive circuit 1a. The optical pulse trains generated by the short pulse light sources 1b-1, 1b-2 each have, e.g., a wavelength spectrum required to generate a short pulse, as indicated by a waveform WA shown in FIG. 3, and correspond to an optical pulse train (e.g., a short pulse train having a repetition cycle of about a few picoseconds to hundreds of femtoseconds) in synchronism with the pulse signal output from the pulse drive circuit 1a (see a waveform WB shown in FIG. 3).

The tap couplers (node sections) 2-1, 2-2 each bifurcate, into two sub-pulse trains, the respective optical pulse trains output from the optical pulse train generation sections 1-1, 1-2 and guide one of the two sub-pulse trains to the optical switch 3 and the remaining sub-pulse train to the optical switch control section 6.

The optical switch 3 functions as an optical switch section for selectively outputting either of the optical pulse trains output from the optical pulse train generation sections 1-1, 1-2. The optical switch 3 can be embodied as, e.g., a 2x1 single-stage optical switch 3A shown in FIG. 4A, a two-stage tandem switch 3B shown in FIG. 4B, an optical switch 3C shown in FIG. 4C, an optical switch 3D additionally provided with a monitor port shown in FIG. 4D, or an optical switch 3E additionally provided with a monitor port shown in FIG. 4E. Even when any one of the optical switches 3A to 3E has been employed, the optical switch can select an optical pulse train under switching control of the optical switch control section 6 to be described later.

Figure 4A:
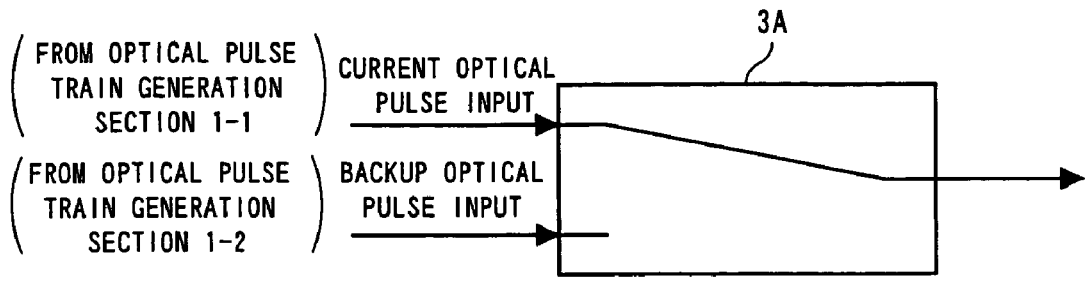
FIGS. 4A to 4E are views respectively showing the principal configuration of the light source apparatus of the first embodiment.

The single-stage optical switch 3A shown in FIG. 4A can be formed from a semiconductor, an optical switch of directional coupler type using a dielectric waveguide, or an optical switch of Mach-Zehnder interferometer type. However, the single stage optical switch 3A may be formed by utilization of another known device. In this single-stage optical switch 3A, the optical pulse trains output from the optical pulse train generation sections 1-1, 1-2 are input to two input ports, respectively. Further, an electrical signal serving as a changeover control signal output from the optical switch control section 6 is applied to the single-stage optical switch 3A, thereby enabling the single stage optical switch 3A to output an optical pulse train through switching operation.

Figure 4B:
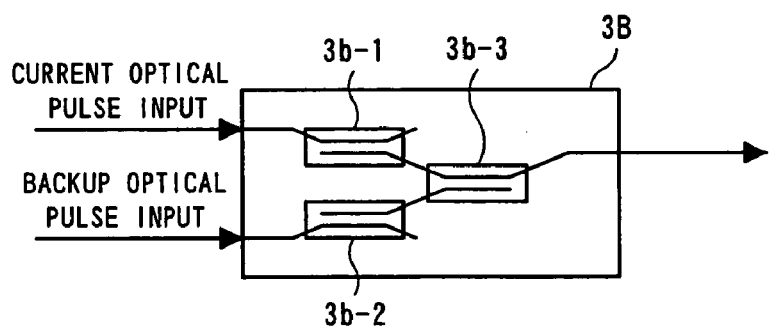

In the two-stage tandem optical switch 3B shown in FIG. 4B, two optical switch elements 3b-1, 3b-2 are provided in parallel on the input side of the optical switch, and an optical switch 3b-3 is provided on the output side of the optical switch elements 3b-1, 3b-2, whereby the optical switch elements 3b-1 to 3b-3 are arranged in a two-stage tandem connection. The optical switch elements 3b-1 to 3b-3 can be formed from a semiconductor, an optical switch of directional coupler type using a dielectric waveguide, or an optical switch of Mach-Zehnder interferometer type. However, the optical switch elements 3b-1 to 3b-3 may be formed by utilization of another known device.

The optical pulse trains output from the respective optical pulse generation sections 1-1, 1-2 are input to respective input ports of the optical switch elements 3b-1, 3b-2. The electrical signal serving as a changeover control signal is applied by the switch control section 6 to the optical switch elements 3b-1 to 3b-3. As a result, a selected optical pulse train can be output from the output port of the optical switch element 3b-3.

Figure 4C:
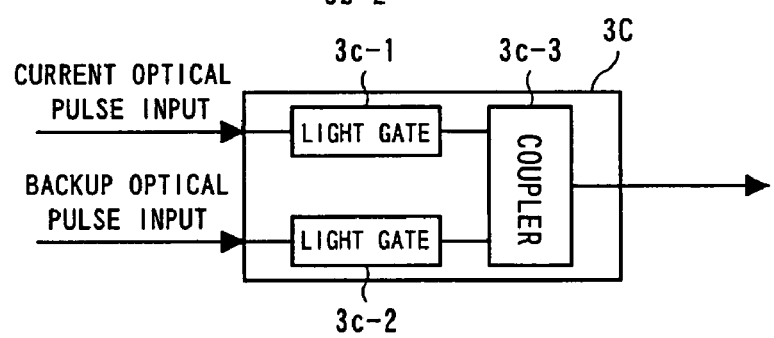

The optical switch 3C shown in FIG. 4C comprises light gates 3c-1, 3c-2 for switching between interruption of an input optical pulse train and leading of an input optical pulse train in accordance with the electrical signal which is output from the switch control section 6 and acts as a changeover control section; and a 3 dB coupler 3c-3. The optical pulse trains output from the optical pulse train generating sections 1-1, 1-2 are input to the light gates 3c-1, 3c-2, respectively. Further, the electrical signal serving as a changeover control signal is applied by the switch control section 6 to the light gates 3c-1, 3c-2, whereby the optical coupler 3c-3 can output the selected optical pulse train. An light gate of Mach-Zehnder interferometer type, an light gate utilizing absorbing and amplifying characteristics of a semiconductor optical amplifier, and a light gate using an absorbing characteristic of an EA (Electro-Absorption) modulator (semiconductor modulator of absorption type) are mentioned as the light gates 3c-1, 3c-2. The light gates 3c-1, 3c-2 may also be formed by utilization of another known device.

Figure 4D:
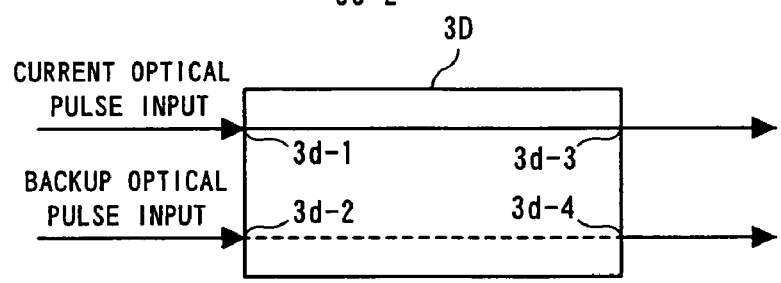

The optical switch 3D shown in FIG. 4D is formed from a semiconductor, an optical switch of directional coupler type using a dielectric waveguide, or an optical switch of Mach-Zehnder interferometer type. The optical pulse trains output from the optical pulse train generation sections 1-1, 1-2 are input by way of two input ports 3d-1, 3d-2. The optical pulse train output from the optical pulse train generation section 1-1 can be output, by way of an output port 3d-3, as the optical pulse train selected by the changeover control signal. The optical pulse train output from the optical pulse train generation section 1-2 can be output as a backup optical pulse train by way of an output port 3d-4.

Figure 4E:
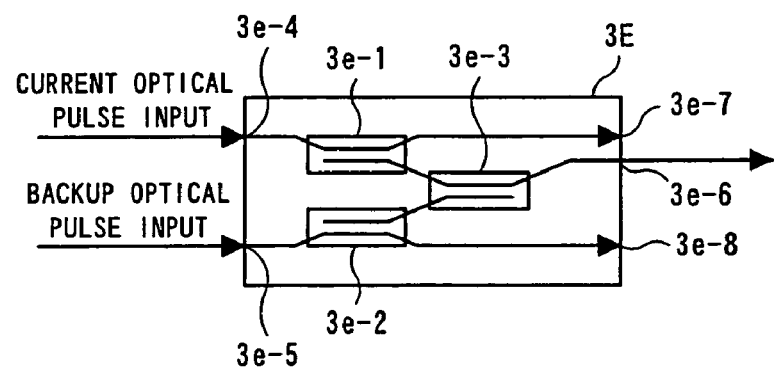

As in the case of the optical switch shown in FIG. 4B, the two-stage tandem optical switch 3E shown in FIG. 4E comprises a two-stage tandem configuration consisting of three optical switch elements 3e-1 to 3e-3. The optical pulse trains output from the optical pulse train generation sections 1-1, 1-2 are input to the input ports 3e-1 to 3e-3 by way of two input ports 3e-4, 3e-5. An optical pulse train selected by the changeover control signal can be output by way of an output port 3e-6. Moreover, the optical pulse train output from the optical pulse train generation section 1-1 can be output as an unselected backup optical pulse train by way of an output port 3e-7, and the optical pulse train output from the optical pulse train generation section 1-2 can be output as an unselected backup optical pulse train by way of an output port 3e-8.

The high nonlinear fiber 7 functions as an output light generation section capable of generating continuous light of a plurality of wavelengths, as output light, from the optical pulse train output from the optical switch 3. Specifically, either of the optical pulse trains generated by the optical pulse train generation sections 1-1, 1-2 (e.g., the optical pulse train generated by the optical pulse train generation section 1-1) is caused to enter the high nonlinear fiber 7 by way of the optical switch 3 while satisfying an optical power level and conditions for a phase between optical carrier side lobes to be used for generating pulses. Consequently, a plurality of optical carriers can be generated at a wavelength (frequency) interval corresponding to the repetition frequency of the thus-input optical pulse train.

Figure 3:
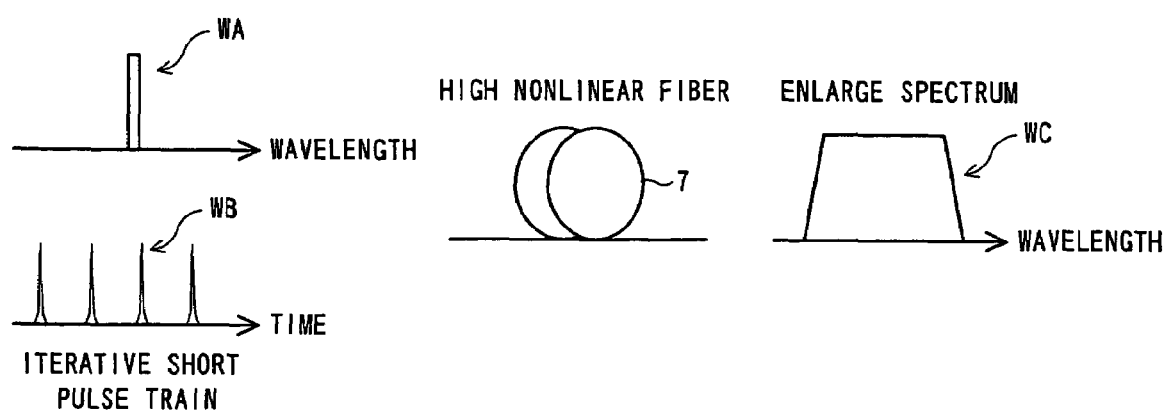
FIG. 3 is a view for describing the principle on the basis of which SC light is generated.

A spectrum waveform WC shown in FIG. 3 represents a wavelength spectrum of continuous light which is an output from the high nonlinear fiber 7. As indicated by the spectrum waveform WC shown in FIG. 3, a plurality of optical carriers can be generated at the wavelength (frequency) interval corresponding to the repetition frequency while light of single wavelength is taken as input light.

The optical switch control section 6 is for controlling the optical switch 3 so as to switch the output of optical pulse train, which is taken as a current optical pulse train by the optical switch 3, in accordance with the states of the respective optical pulse trains generated by the optical pulse train generation sections 1-1, 1-2 without involvement of instantaneous interruption of power. The optical switch control section 6 is formed from photodiodes 4-1, 4-2 serving as photoelectric conversion sections, and an electrical signal processing section 5.

The photodiode 4-1 converts the optical pulse train output from the optical pulse train generation section 1-1 into an electrical signal, and the photodiode 4-2 converts the optical pulse train output from the optical pulse train generation section 1-2 into an electrical signal. On the basis of the states of the respective optical pulse trains of the optical pulse generation sections 1-1, 1-2, which have been converted into the electrical signals by the photodiodes 4-1, 4-2, the electrical signal processing section 5 controls the optical switch 3 for the purpose of switching either of the optical pulse trains output from the optical pulse train generation sections 1-1, 1-2 to an optical pulse train for current use.

In terms of the function of the electrical signal processing section 5, the electrical signal processing section 5 comprises an anomaly detection section 5a, a timing extraction section 5b, and the first control signal output section 5c.

The anomaly detection section 5a is for detecting anomalies in the respective optical pulse trains converted into the electrical signals by the photodiodes 4-1, 4-2. Specifically, the anomaly detection section 5a is arranged to sense a decrease in or loss of the optical power level of the optical pulse train used as a current pulse train, thereby detecting the decrease or loss as occurrence of a failure (an anomaly). In addition, the anomaly detection section 5a may detect occurrence of an anomaly by determining whether or not the pulse width, or the like, has fallen outside a prescribed range.

The timing extraction section 5b is for extracting extinction/illumination timings of the respective optical pulse trains converted into the electrical signals by the photodiodes 4-1, 4-2. Specifically, the timing extraction section 5b extracts clock signal components, as illumination timings, from the respective optical pulse trains which have been converted into electrical signals by the photodiodes 4-1, 4-2 and are output from the optical pulse train generation sections 1-1, 1-2. An intermediate timing of the extracted clock signal components is extracted as an illumination timing.

When the anomaly detection section 5a has detected anomalies in the optical pulse train taken as a pulse train for current use, the first control signal output section 5c outputs the first control signal to the optical switch 3 at the extinction timing extracted by the timing extraction section 5b, in order to switch the current optical pulse train (to the backup optical pulse train) without involvement of instantaneous interruption of power.

Figure 2:
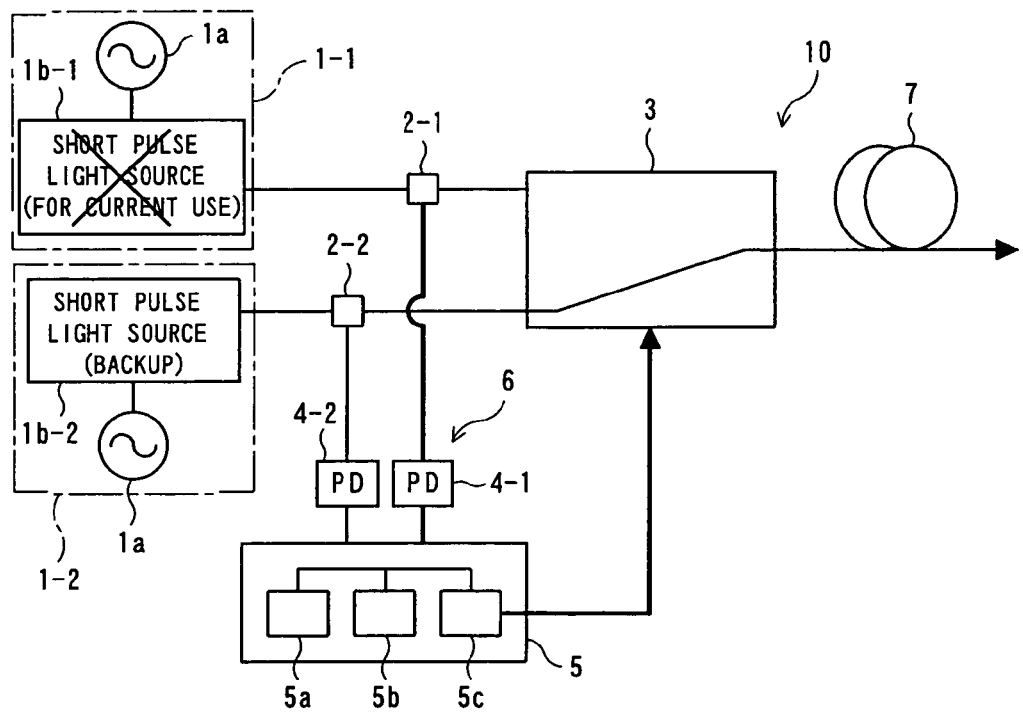
FIG. 2 is a view for describing operation of the first embodiment of the present invention.

Specifically, as shown in FIG. 2, when a failure has arisen in the optical pulse train generation section 1-1 working for current use and when the anomaly detection section 5a has detected occurrence of anomalies in the optical pulse train output from this optical pulse train generation section 1-1, the first control signal output section 5c is arranged to output a control signal (a changeover trigger) to the optical switch 3 so as to switch the backup optical pulse train generation section 1-2 to the current optical pulse train generation section.

As a result, the optical pulse train generated by the optical pulse train generation section 1-2 can be output to the high nonlinear fiber 7 by way of the optical switch 3. In a case where this switching operation is performed, the anomaly detection section 5a is required to have determined that no anomaly has arisen in the backup optical output pulse before the first control signal output section 5c outputs the control signal.

Figure 5:
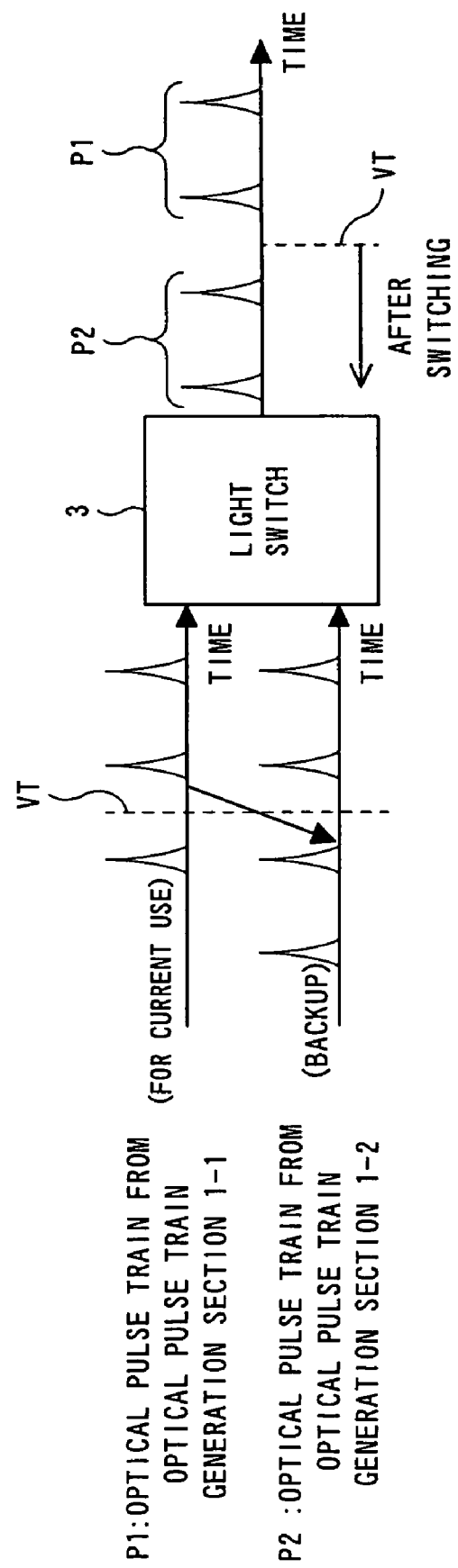
FIG. 5 is a view for describing operation of the first embodiment according to the present invention.

As shown in FIG. 5, the timing extraction section 5b extracts an extinction timing VT of optical pulse trains P1, P2 which are synchronously generated by and output from the optical pulse train generation sections 1-1, 1-2. The timing extraction section 5b then outputs the first control signal to the optical switch 3 such that the current optical pulse generation section 1-1 is switched to the backup optical pulse generation section 1-2 at the extinction timing VT. Namely, the optical pulse train output from the optical switch 3 is switched from the optical pulse train P1 to the optical pulse train P2 at the extinction timing VT. Here, the extinction timing is a timing at which light levels of the two optical pulse trains P1, P2 output from the optical pulse train generation sections 1-1, 1-2 become zero.

Thus, the optical switch 3 switches between the two optical pulse trains output from the optical pulse train generation sections 1-1, 1-2 at the timing of extinction, whereby after output the thus-output optical pulse train can be handled as if the pulse train originated from a single light source. Therefore, in the event that a failure has arisen in the current optical pulse generation section 1-1, the optical pulse train is output to the high nonlinear fiber 7 without disconnection (or while maintaining a repetition cycle); that is, without instantaneous interruption of power.

By means of the foregoing configuration, even when the optical pulse generation sections 1-1, 1-2 are switched between a current optical pulse generation section and a backup optical pulse generation section (i.e., the optical pulse generation sections 1-1, 1-2 are subjected to redundancy switching), switching can be performed without involvement of instantaneous interruption of power, as described below.

Specifically, in normal times, either of the two optical pulse train generation sections 1-1, 1-2 (e.g., an optical pulse generation section 1-1) is taken for current use, and the high nonlinear fiber 7 generates continuous light having a plurality of carriers, which is to become output light, from a periodic optical pulse train output from the current optical pulse train generation section 1-1 and outputs the thus-generated output light.

When the anomaly detection section 5a of the optical switch control section 6 has determined that an anomaly has arisen in the optical pulse train output from the current optical pulse train generation section 1-1 and that a normal optical pulse train is generated by the backup optical pulse train generation section 1-2, the first control signal output section 5c outputs a changeover trigger, as the first control signal, to the optical switch 3 in order to switch the optical pulse train to be output to the high nonlinear fiber 7 between the two optical pulse trains output from the optical pulse train generation sections 1-1, 1-2.

The first control signal output section 5c can output the first control signal such that the output pulse train is switched at the timing of extinction extracted by the timing extraction section 5b. The optical pulse train generation section 1-2 that has not been taken for current use is switched to the current optical pulse train generation section without involvement of instantaneous interruption of power. The high nonlinear fiber 7 stably generates continuous light—which is to come to output light and has a plurality of carriers—from the periodic optical pulse train output from the optical pulse train generation section 1-2 switched for current use and outputs the thus-generated continuous light (even when switching operation of the optical switch 3 has arisen).

As mentioned above, according to the first embodiment, switching from the current system to the backup system without involvement of instantaneous interruption of power can be performed through use of the light source apparatus 10 functioning as the SC light source. Hence, even when a failure, or the like, has arisen in the optical pulse train generation section (e.g., the optical pulse generation section 1-1) of the current system, the current optical pulse train can be switched to the optical pulse train output from the backup optical pulse train generation section (e.g., the optical pulse train generation section 1-2) of the backup system without involvement of instantaneous interruption of power. There is yielded an advantage of the ability to stably generate the continuous light which is to become output light and has a plurality of carriers and to output the thus-generated continuous light.

Particularly, so long as the anomaly detection section 5a detects an anomaly upon detection of a decrease in the light level of the current optical pulse train, there is yielded an advantage of the ability to avoid interruption of the continuous light which is being output during a period from when a failure in the anomaly detection section 5a has been detected until when the current system is switched to the backup system.

[A1] Description of the First Modification of the First Embodiment

Figure 6:
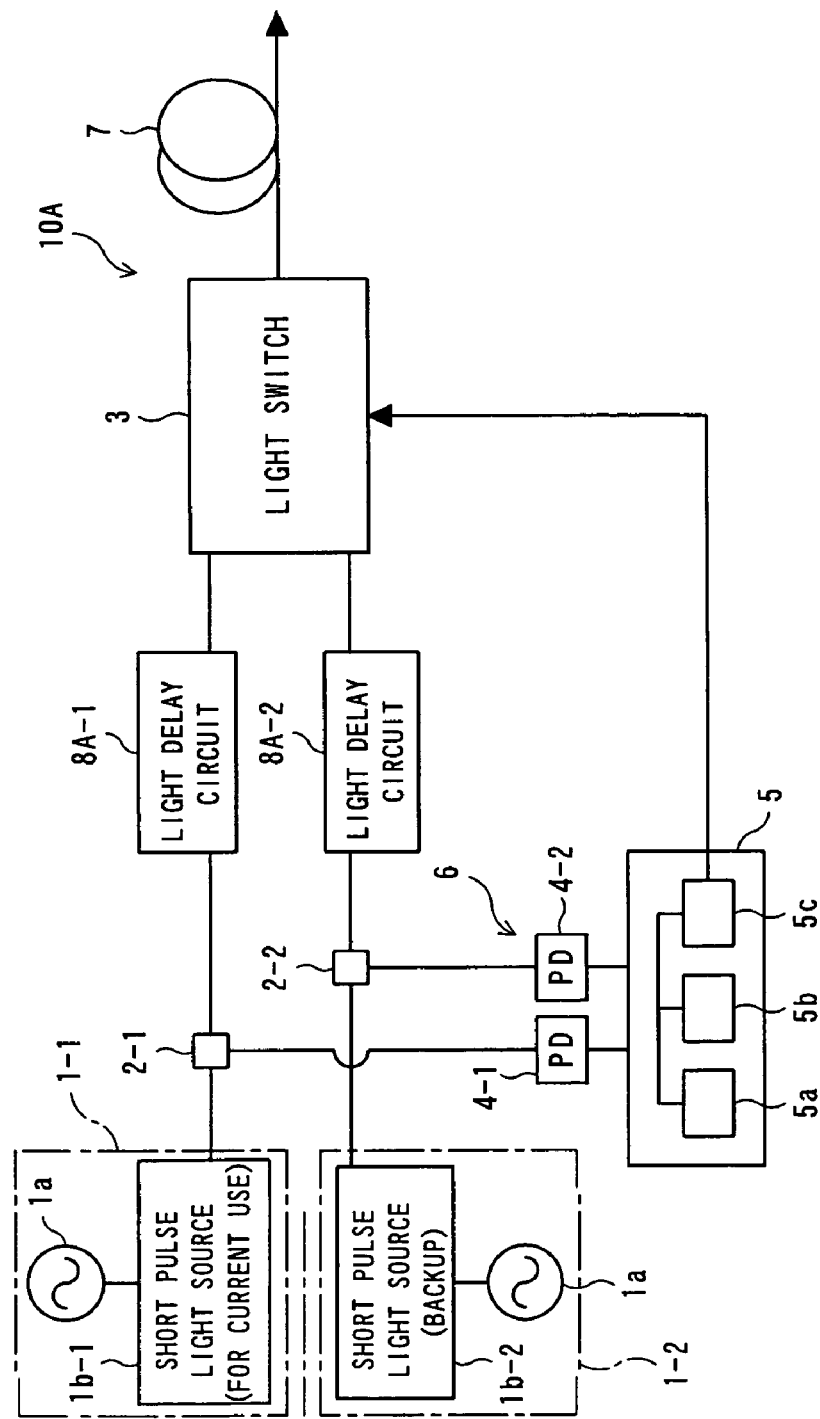
FIG. 6 is a block diagram showing the light source apparatus according to the first modification of the first embodiment according to the present invention.

FIG. 6 is a block diagram showing a light source apparatus 10A of the first modification of the first embodiment of the invention. The light source apparatus 10A shown in FIG. 6 differs from the light source apparatus 10 of the first embodiment in that a light delay circuit 8A-1 for delaying propagation of an optical pulse train is interposed between the tap coupler 2-1 serving as a node section and the optical switch 3, as well as in that a light delay circuit 8A-2 for delaying propagation of the optical pulse train is interposed between the tap coupler 2-2 and the optical switch 3. In other respects, the first modification is identical with the first embodiment. In FIG. 6, those reference numerals which are the same as those in FIG. 1 denote substantially identical sections.

The light delay circuits 8A-1, 8A-2 can be formed from, e.g., an optical fiber. However, the present invention also allows adoption of a known device other than the optical fiber.

A period of time from when the failure has actually arisen until when the optical switch 3 is switched is delayed by means of the light delay circuits 8A-1, 8A-2. Thereby, the anomaly detection section 5a detects interruption of an optical signal, and the trigger signal output from the first control signal output section 5c can be sent to the optical switch 3 before arrival of the optical pulse train under the influence of the failure. Put another way, detection of occurrence of a failure by the anomaly detection section 5a and switching operation of the optical switch 3 can be completed by means of the light delay circuits 8A-1, 8A-2 before the current optical pulse train responsible for detection of the failure arrives at the optical switch 3 by way of the node section 2-1.

Figure 7:
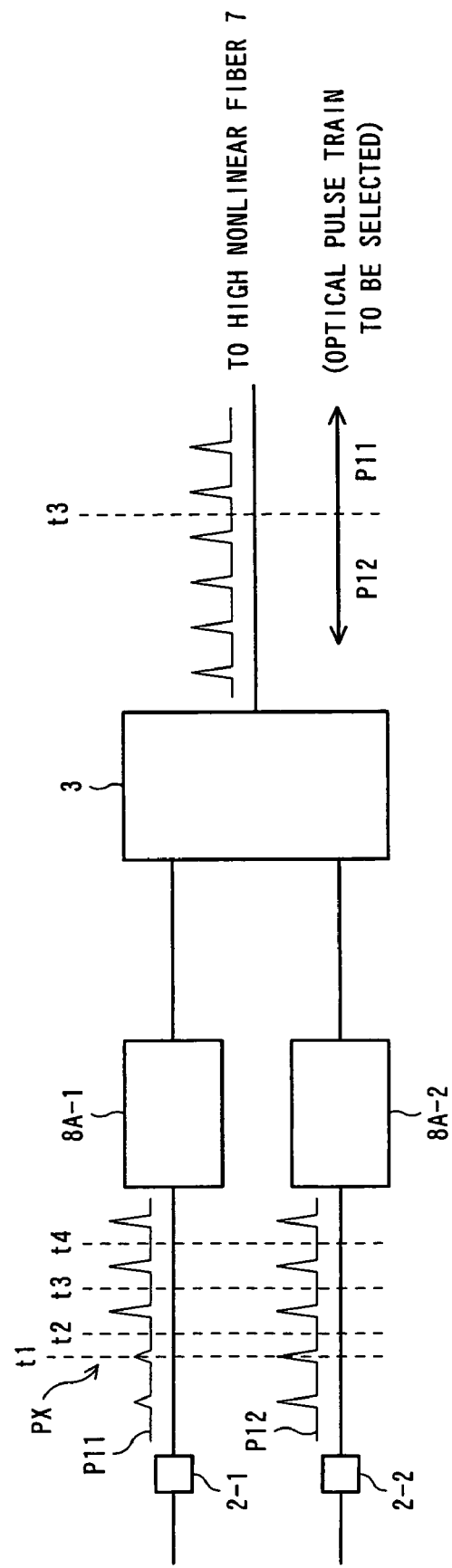
FIG. 7 is a view for describing operation of a light delay circuit.

FIG. 7 is a view for describing operation of the light delay circuits 8A-1, 8A-2. As shown in FIG. 7, optical pulse trains P11, P12 are assumed to be input to the light delay circuits 8A-1, 8A-2. Under the assumption that a failure has arisen in the optical pulse train P11 at a point in time t1, the optical pulse P11 is switched to the optical pulse train P12 output from the optical pulse train generation section 1-2 before a pulse PX responsible for detection of a failure at a point in time t1 arrives at the optical switch 3 through propagation delay by the light delay circuit 8A-1.

For instance, the first control signal output section 5c outputs a changeover trigger to the optical switch 3 at the timing of extinction (e.g., points in time t2, t3 or t4; or the point in time t3 depicted on the right side in FIG. 7) in a stage where a normal optical pulse train preceding the pulse PX has been output. As a result, the optical pulse train is output from the optical switch 3 while maintaining a constant repetition cycle.

Consequently, switching operation of the optical switch 3 can be realized without involvement of instantaneous interruption of power, by means of the light delay circuits 8A-1, 8A-2 provided in the light source apparatus. Particularly, even when the anomaly detection section 5a has detected interruption of an input of the current optical pulse train as a failure, there is yielded an advantage of the ability to avoid interruption of the CW light which is to become output light.

[A2] Description of the Second Modification of the First Embodiment

Figure 8:
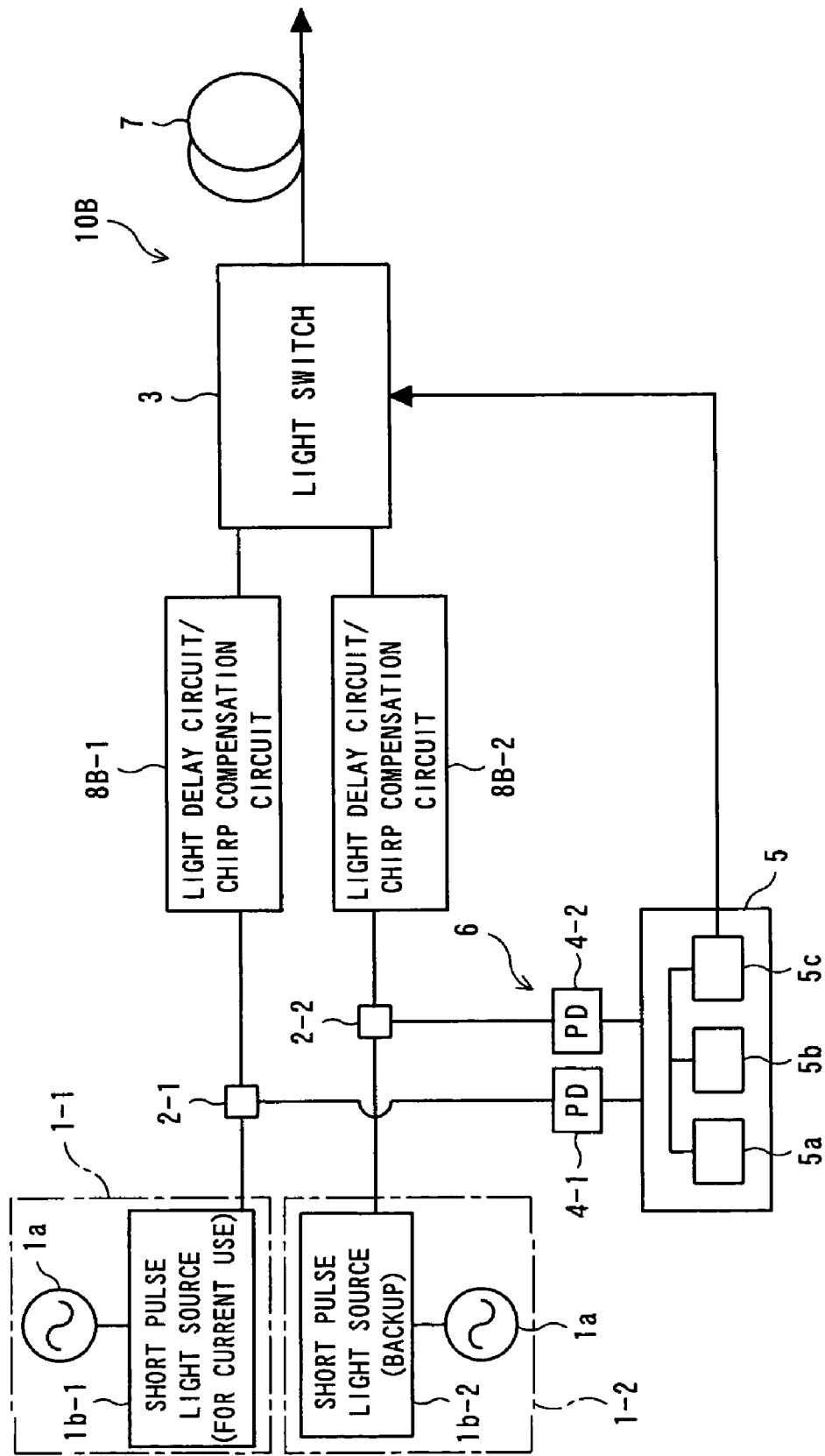
FIG. 8 is a block diagram showing a light source apparatus according to the second modification of the first embodiment according to the present invention.

FIG. 8 is a block diagram showing a light source apparatus 10B according to the second modification of the first embodiment according to the present invention. The light source apparatus 10B shown in FIG. 8 differs from the light source apparatus 10A in that light delay/chirp compensation circuits 8B-1, 8B-2 are provided in lieu of the light delay circuits 8A-1, 8A-2. In other respects, the light source apparatus is identical in configuration with the light source apparatus shown in FIG. 6. In FIG. 8, those reference numerals which are the same as those in FIG. 6 denote substantially identical sections.

The light delay/chirp compensation circuit 8B-1 is interposed between the tap coupler 2-1 and the optical switch 3, and the light delay/chirp compensation circuit 8B-2 is interposed between the tap coupler 2-2 and the optical switch 3. Each of the light delay/chirp compensation circuits 8B-1, 8B-2 functions as a light delay circuit for delaying propagation of the respective optical pulse train and also functions to serve as a chirp compensation circuit for effecting chirp compensation. Like the light delay circuits 8A-1, 8A-2 shown in FIG. 6, the light delay/chirp compensation circuits 8B-1, 8B-2 can be constituted of, e.g., an optical fiber, or the like.

However, the present invention also allows adoption of a known device other than the optical fiber for the light delay circuit and the chirp compensation circuit.

There arises a case where the optical pulse trains output from the optical pulse train generation sections 1-1, 1-2 are subjected to a difference between the phase of a side lobe frequency and the center wavelength under influence of a frequency chirp due to modulation induced at the time of generation of a pulse. When the optical pulse train with the phase difference is input to the high nonlinear fiber 7, the quality of continuous light (SC light) of a plurality of channels serving as output light is affected.

The optical fibers, which serve as the light delay/chirp compensation circuits 8B-1, 8B-2, have the same light delay function as that of the light delay circuits 8A-1, 8A-2 shown in FIG. 6. In order to compensate for influence of the frequency chirp such as that mentioned above, the optical fibers have a wavelength dispersion characteristic for compensating for an initial chirp of the optical pulse trains output from the light pulse train generation sections 1-1, 1-2. More specifically, frequency chirp characteristics of the optical pulse trains generated by the optical pulse train generation sections 1-1, 1-2 have been measured in advance. The light delay/chirp compensation circuits 8B-1, 8B-2 are constituted of optical fibers having such a length as to compensate for a measured frequency chirp while ensuring a delay time for causing the optical fibers to act as light delay circuits.

By means of the light delay/chirp compensation circuits 8B-1, 8B-2, the anomaly detection section 5a can detect interruption of an optical signal, and the trigger signal output from the first control signal output section 5c can be sent to the optical switch 3 before the pulse under influence of the failure arrives at the optical switch 3. The pulse, which would cause a failure, is prevented from entering the high nonlinear fiber 7, thereby switching the source for generating an optical pulse train to another source without instantaneous interruption of power. Moreover, the optical pulse trains generated by the optical pulse train generation sections 1-1, 1-2 can be output to the optical switch 3 after the frequency chirps of the optical pulse trains have been compensated.

Therefore, as a result of the light source apparatus being provided with the light delay/chirp compensation circuits 8B-1, 8B-2, switching of the optical switch 3 without involvement of instantaneous interruption of power can be implemented. Hence, in addition to yielding the same advantage as that yielded in the embodiment shown in FIG. 6, the present embodiment can also yield an advantage of the ability to enhance the quality of the SC light output from the high nonlinear fiber 7, because the frequency chirps of the optical pulse trains generated by the optical pulse train generation sections 1-1, 1-2 can be compensated.

[A3] Description of the Third Modification of the First Embodiment

Figure 9:
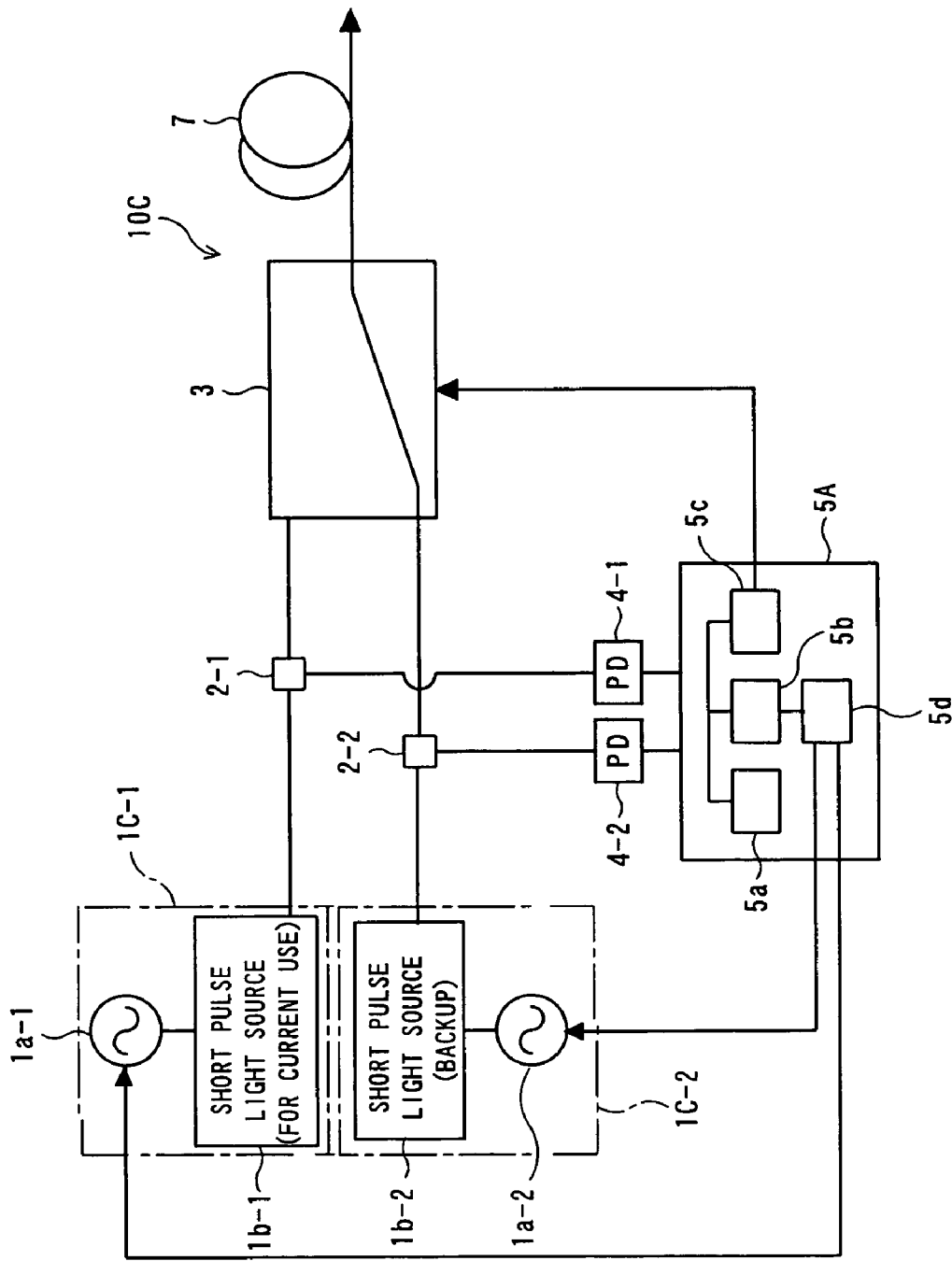
FIG. 9 is a block diagram showing a light source apparatus according to the third modification of the first embodiment according to the present invention.

FIG. 9 is a block diagram showing a light source apparatus 10C according to the third modification of the first embodiment according to the present invention. The light source apparatus 10C shown in FIG. 9 differs from the light source apparatus of the first embodiment in that optical pulse train generation sections 1C-1, 1C-2 are provided with different pulse drive circuits 1a-1, 1a-2 and in that the light source apparatus is provided with a sync control section 5d for synchronizing clock signals output from the pulse drive circuits 1a-1, 1a-2 of the respective optical pulse train generation sections 1C-1, 1C-2.

An electrical signal processing section 5A of the light source apparatus 10C shown in FIG. 9 comprises an anomaly detection section 5a, a timing extraction section 5b, and the first control signal 5c, which are the same as those of the first embodiment. The electrical signal processing section 5A further comprises a sync control section 5d for controlling synchronization of the pulse drive circuits 1a-1, 1a-2 of the respective pulse train generation sections 1C-1, 1C-2 at the extinction/illumination timings of the respective optical pulse trains extracted by the timing extraction section 5b.

On the basis of the clock signal components extracted from the optical pulse trains output from the optical pulse train generation sections 1C-1, 1C-2 by the timing extraction section 5b, the sync control section 5d detects jitter in the clock signal components and outputs a control signal to the respective pulse drive circuits 1a-1, 1a-2 so as to suppress the detected jitter.

Figure 10A:
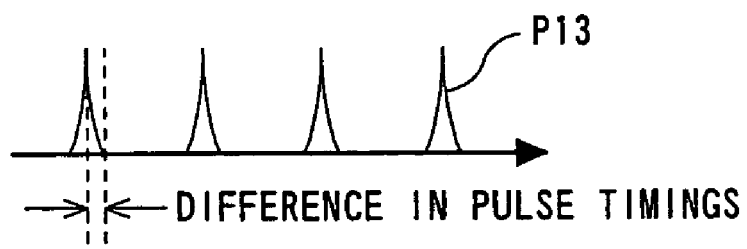
FIGS. 10A to 10D are views for describing operation of the third modification of the first embodiment according to the present invention.
Figure 10B:
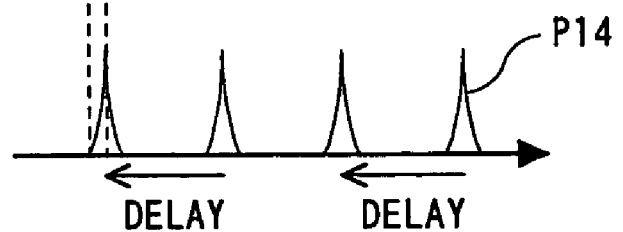
Figure 10C:
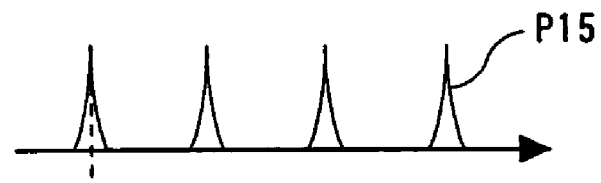
Figure 10D:
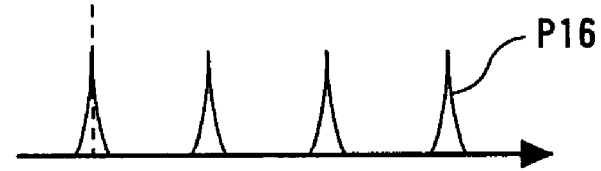

For instance, as shown in FIGS. 10A and 10B, a difference exists between a pulse timing of an optical pulse train P13 being generated by the current optical pulse train generation section 1C-1 and an optical pulse train P14 being generated by the backup optical pulse train generation section 1-2. When the difference has been ascertained by the sync control section 5d, the sync control section 5d imparts the sync control signal to, e.g., the pulse drive circuit 1a-2 of the backup optical pulse train generation section 1-2, thereby delaying the optical pulse train generated by the optical pulse train generation section 1-2. As shown in FIGS. 10C and 10D, pulse timings of the optical pulse trains P15, P16 generated by the respective optical pulse train generation sections 1C-1, 1C-2 can be made coincident with each other.

Consequently, even when the optical pulse train generation sections 1C-1, 1C-2 are provided with separate pulse drive circuits 1a-1, 1a-2, the optical pulse trains generated by the respective pulse train generation sections 1C-1, 1C-2 can be synchronized. Therefore, as in the case of the first embodiment, the current system can be switched to the backup system between the optical pulse train generation sections 1C-1, 1C-2 without involvement of instantaneous interruption of power, thereby yielding the same advantage as that yielded in the first embodiment.

[B] Description of the Second Embodiment

Figure 11:
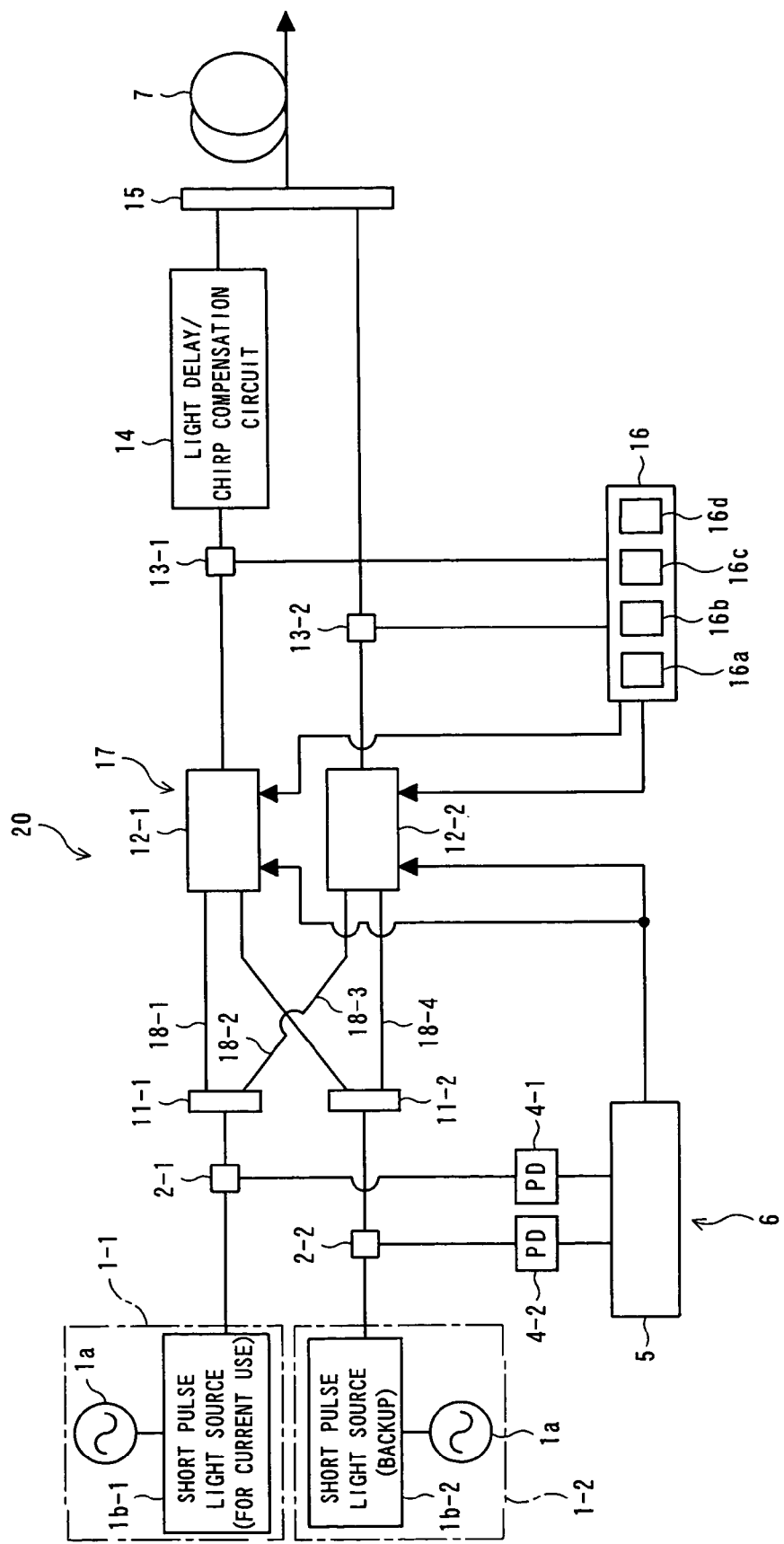
FIG. 11 is a block diagram showing a light source apparatus according to the second embodiment of the present invention.

FIG. 11 is a block diagram showing a light source apparatus 20 according to the second embodiment of the present invention. The light source apparatus 20 shown in FIG. 11 differs from that of the first embodiment (see FIG. 1) in that the light source apparatus has a redundancy configuration in the form of an optical switch section 17. In other respects, the light source apparatus 20 is identical in configuration with the light source apparatus of the first embodiment. For instance, in the event that an anomaly has arisen in the optical pulse train output from the current optical pulse train generation section 1-1, the optical switch control section 6 switches the current optical pulse train to the optical pulse train output from the backup optical pulse train generation section 1-2.

Here, in contrast with the light source apparatus 10 of the first embodiment, the light source apparatus 20 shown in FIG. 11 comprises the optical switch section 17 of redundancy configuration and a switch-to-be-used changeover control section 16 for controlling switching of working light switches in the optical switch section 17 of redundancy configuration.

The optical switch section 17 is capable of selectively outputting an optical pulse train to be used for generating output light from among the optical pulse trains output from the optical pulse train generation sections 1-1, 1-2, as in the case of the optical switch 3 of the first embodiment. The optical switch section 17 comprises 3 dB couplers 11-1, 11-2; optical fibers 18-1 to 18-4; two optical switches 12-1, 12-2; tap couplers 13-1, 13-2; and a 3 dB coupler 15.

The 3 dB coupler 11-1 is for bifurcating an optical pulse train output from the tap coupler 2-1 into two branches and outputs one of the two branches to the optical switch 12-1 by way of the optical fiber 18-1 and the remaining branch to the optical switch 12-2 by way of the optical fiber 18-2. Likewise, the 3 dB coupler 11-2 is for bifurcating an optical pulse train output from the tap coupler 2-2 into two branches and outputs one of the two branches to the optical switch 12-1 by way of the optical fiber 18-3 and the remaining branch to the optical switch 12-2 by way of the optical fiber 18-4.

The optical switches 12-1, 12-2 function as first and second optical switches which receive the optical pulse trains output from the optical pulse train generation sections 1-1, 1-2 by way of the 3 dB couplers 11-1, 11-2 and can selectively output an optical pulse train to be taken for current use among the input optical pulse trains, under control of the optical switch control section 6.

Of the optical switches 12-1, 12-2, the optical switch 12-1, for example, is usually used for selecting an optical pulse train. However, when a failure has arisen in the optical switch 12-1 itself as a result of selective control operation performed by the switch-to-be-used change over control section 16 to be described later, the optical switch 12-1 is switched to the other optical switch 12-2, and this optical switch 12-2 can select an optical pulse train.

The optical switch to be used for selecting an optical pulse train operates in the same manner as does the optical switch 3 of the first embodiment. However, the optical switch not to be used for selecting an optical pulse train is made to output none of the optical pulse trains output from the optical pulse train generation sections 1-1, 1-2.

Therefore, the optical switches 12-1, 12-2 of the second embodiment can be configured in the same manner as is the optical switch (see reference numeral 3C) shown in FIG. 4C set forth. If unillustrated gates—which enable flow/interruption of outputs from the optical switches 12-1, 12-2 upon receipt of a control signal output form the switch-to-be-used changeover control section 16—are interposed, by way of modification, between the optical switches 12-1, 12-2 and the tap couplers 13-1, 13-2, the optical switches 12-1, 12-2 can be configured in the same manner as are the optical switches 3A, 3B, 3D and 3E shown in FIGS. 4A, 4B, 4D and 4E.

The tap couplers 13-1, 13-2 are provided on optical transmission paths connected to the output sides of the redundancy switches 12-1, 12-2 and bifurcate each of the optical pulse trains selected by the redundancy switches 12-1, 12-2 into two branches. In each case, one of the two branches can be output to the high nonlinear fiber 7, and the other branch can be output to the switch-to-be-used changeover control section 16.

Moreover, the 3 dB coupler 15 is for guiding the optical pulse train output from the first optical switch 12-1 or the second optical switch 12-2, which is to be used for selecting an optical pulse train, to the high nonlinear fiber 7.

The switch-to-be-used changeover control section 16 uses the first optical switch 12-1 of the first and second optical switches 12-1, 12-2 in normal times for selectively outputting an optical pulse train taken for current use. In the event that an anomaly has arisen in the optical pulse train output from the first optical switch 12-1, switching between the first optical switch 12-1 and the second optical switch 12-2 is controlled so as to use the second optical switch 12-2 for selectively outputting an optical pulse train to be taken for current use.

Moreover, the switch-to-be-used changeover control section 16 comprises a photodiode 16a for converting the current optical pulse train into an electrical signal; an anomaly detection section 16b for detecting an anomaly in the optical pulse train which has been converted into the electrical signal by the photodiode 16a and taken for current use; a timing extraction section 16c for extracting an illumination/extinction timing of the current optical pulse train; and a control signal output section 16d for outputting a control signal to be used for switching a switch to be used to the optical switches 12-1, 12-2 at the timing of extinction extracted by the timing extraction section 16c when the anomaly detection section 16b has detected an anomaly in the current optical pulse train.

When the gates for enabling flow/interruption of the outputs from the respective optical switches 12-1, 12-2 are provided, the switch-to-be-used changeover control section 16 monitors an optical pulse train output from the unused optical switch 12-2. When a failure has arisen in the unused optical switch 12-2, an alarm or the like is output without switching the optical switch 12-2 to an optical switch to be used. This prevents a state in which the failure has already arisen in the optical switch to which switching is made, thereby enhancing reliability of switching of a switch to be used.

In the second embodiment, a light delay/chirp compensation circuit 14 is provided on the output side of the optical switch 12-1 used in normal times; more specifically, a position between the tap couplers 13-1 and the 3 dB coupler 15.

On account of this, the optical switch to be used can be switched to the optical switch 12-2 in a preceding stage from when the failure has arisen in the optical switch 12-1 until when a pulse generated after occurrence of the failure is output to the optical coupler 15 and the high nonlinear fiber 7. Hence, the optical pulse train originating from the optical switch 12-1 can be prevented from being delivered to the optical coupler 15 and the high nonlinear fiber 7 after occurrence of the failure. The optical switch to be used is switched between the optical switch 12-1 and the optical switch 12-2 without involvement of instantaneous interruption of power. Moreover, the optical pulse trains generated by the optical pulse train generation sections 1-1, 1-2 can be output to the optical switch 3 after the frequency chirp of the optical pulse trains has been compensated.

By means of the above-described configuration, in the light source apparatus 20 of the second embodiment, the pulse trains output from the optical pulse train generation sections 1-1, 1-2 are each bifurcated into two branches by the 3 dB couplers 11-1, 11-2. Subsequently, the bifurcated pulse trains are input from the current optical pulse train generation section 1-1 and the backup optical pulse train generation section 1-2 to the optical switches 12-1, 12-2 each having a redundancy configuration.

The outputs from the optical switches 12-1, 12-2 are again coupled together by the coupler 15. The optical pulse train output from the coupler 15 is input to the high nonlinear fiber 7, and the high nonlinear fiber 7 outputs the SC light.

At this time, when the optical switch 12-1 to be used for selecting an optical pulse train operates normally (i.e., when the anomaly detection section 16a detects no anomalies), the optical pulse train selectively output by the optical switch 12-1 is output to the coupler 15 by way of the light delay/chirp compensation circuit 14.

When the anomaly detection section 16a has detected occurrence of a failure in the optical switch 12-1 used for selecting an optical pulse train, the control signal output section 16d outputs, to the respective optical switches 12-1, 12-2, a control signal for enabling use of the optical switch 12-2 for selecting the optical pulse train but preventing use of the optical switch 12-1.

As a result, the outputs from the optical switches 12-1, 12-2 are switched during a period of delay time generated by the light delay/chirp compensation circuit 14 connected to a stage subsequent to the switch 12-1. Even when a failure has arisen in the optical switch 12-1, the optical switch to be used can be switched to another optical switch without involvement of instantaneous interruption of power.

When the optical switch 12-1 determined to have a failure has been replaced with an optical switch which operates normally, all the delay time of the switch section 12-1 and the light delay/chirp compensation circuit 14 is first measured, and the timing of the optical switch 12-1 is synchronized with the timing of the optical switch 12-2, whereby the optical switch to be used is switched back to the optical switch 12-1.

Even when any one of the optical switches 12-1, 12-2 is used, the optical switches 12-1, 12-2 can selectively output any of the optical pulse trains output from the optical switch sections 1-1, 1-2 under control of the optical switch control section 6, as in the case of the first embodiment.

As mentioned above, the second embodiment yields the same advantage as that of the first embodiment. Even when a failure, or the like, has arisen in the first optical switch 12-1 in use, the switch 12-1 can be changed to the second optical switch 12-2 without involvement of instantaneous interruption of power by means of the switch-to-be-sued changeover control section 16 in conjunction with the first and second optical switches 12-1, 12-2. As a result, there is also yielded an advantage of the ability to output the CW light which becomes output light more stably and make an attempt to stabilize operation of the light source apparatus dramatically.

In the above-described embodiment, the light delay/chirp compensation circuit 14 is interposed between the tap coupler 13-1 and the coupler 15. However, according to the present invention, the light delay/chirp compensation circuit 14 can be omitted. Alternatively, the present invention may be provided with a light delay circuit analogous to that shown in FIG. 6.

[B1] Descriptions of Modifications of the Second Embodiment

In relation to the optical switches 12-1, 12-2 of the second embodiment, the optical pulse train output from the optical pulse generation section 1-1 is bifurcated into two branches by the 3 dB coupler 11-1, and the optical pulse train output from the optical pulse generation section 1-2 is bifurcated into two branches by the 3 dB coupler 11-2. The thus-bifurcated respective signals are input to the optical switches 12-1, 12-2 each having a redundancy configuration, by way of the optical fibers 18-1 to 18-4.

Because of the influence of the light transmission distance between the couplers 11-1, 11-2 and the optical switches 12-1, 12-2; that is, the influence of lengths of the optical fibers 18-1 to 18-4, perfect synchronization of the timings at which the optical pulse trains output from the two optical pulse generation sections 1-1, 1-2 are input to the optical switches 12-1, 12-2 is difficult to be performed by means of control of the pulse drive circuit 1a.

Figure 12:
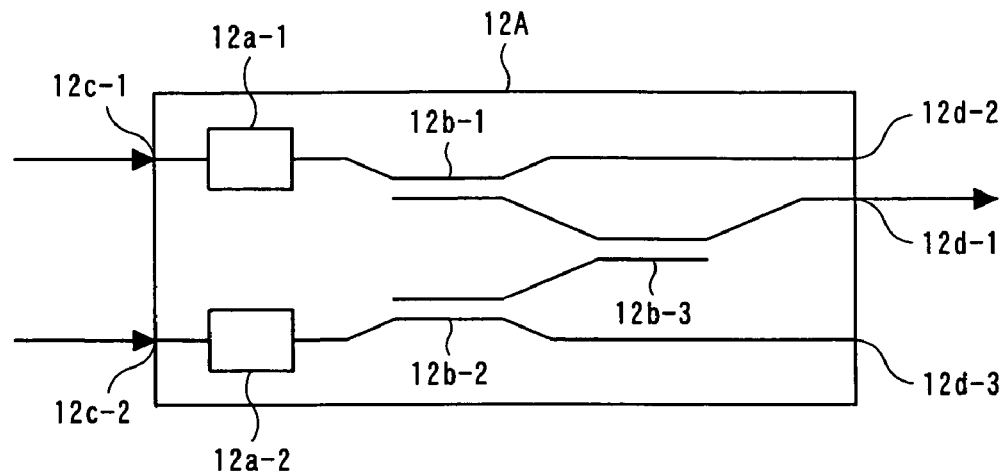
FIG. 12 is a block diagram showing a modification of the second embodiment according to the present invention.

For this reason, as shown in, e.g., FIG. 12, the optical switches 12-1, 12-2 shown in FIG. 11 are replaced with an optical switch 12A having optical phase adjustment sections 12a-1, 12a-2 provided at input terminals thereof, thereby enabling correction of a difference between the timings of input pulses attributable to a slight difference in length among the optical fibers 18-1 to 18-4 within the optical switch.

Here, the optical switch 12A shown in FIG. 12 has a double tandem configuration formed from three optical elements 12b-1 to 12b-3. The optical phase adjustment sections 12a-1, 12a-2 are integrated with the optical switch elements 12b-1 to 12b-3 at stages prior to the respective input-side optical switch elements 12b-1, 12b-2.

The optical phase adjustment sections 12a-1, 12a-2 are formed with electrodes to be used for supplying an electrical signal for phase adjustment to a waveguide formed in a substrate made of, such as lithium niobate or the like. The optical phase adjustment sections 12a-1, 12a-2 can perform phase adjustment operation such that the two optical pulse trains input from, e.g., the input ports 12c-1, 12c-2 can be brought in phase with each other. Specifically, the optical phase adjustment sections 12a-1, 12a-2 can correct a difference between a time at which the optical pulse train output from the optical pulse train generation section 1-1 arrives at the optical switch 12A serving as the first optical switch and a time at which the optical pulse train output from the optical pulse train generation section 1-2 arrives at the optical switch 12A serving as the second optical switch.

Any one of the two optical pulse trains whose phases have been adjusted by the optical phase adjustment sections 12a-1, 12a-2 is selectively output from the output port 12d-1 by way of the optical switch elements 12b-1 to 12b-3, as in the case of the optical switch 3E shown in FIG. 4E. The other unselected backup optical pulse train can be monitored by way of the output ports 12d-2, 12d-3.

As a result of the optical switches 12-1, 12-2 shown in FIG. 11 having been replaced with the optical switch 12A, the output port 12d-1 of the optical switch 12A is constituted as a current optical pulse train output port for outputting an optical pulse train to be taken for current from among the optical pulse trains output from the two optical pulse train generation sections 1-1, 1-2. The output ports 12d-2, 12d-3 are constituted as backup optical pulse train output ports to be used for outputting a backup output pulse train other than the current optical pulse train for monitoring purpose.

The anomaly detection section 16a of the switch-to-be-used changeover control section 16 can determine occurrence of an anomaly in the optical switch 12A serving as both the first and the second optical switches, by means of monitoring a pulse train for backup output from the output ports 12d-2, 12d-3 of the optical switch 12A serving as both the first and the second switches.

The optical switch into which the optical phase adjustment sections 12a-1, 12a-2 are integrated may be substituted by any of the optical switches 3A to 3D shown in FIGS. 4A to 4D as well as the optical switch 3E shown in FIG. 4E.

[C] Description of the Third Embodiment

Figure 13:
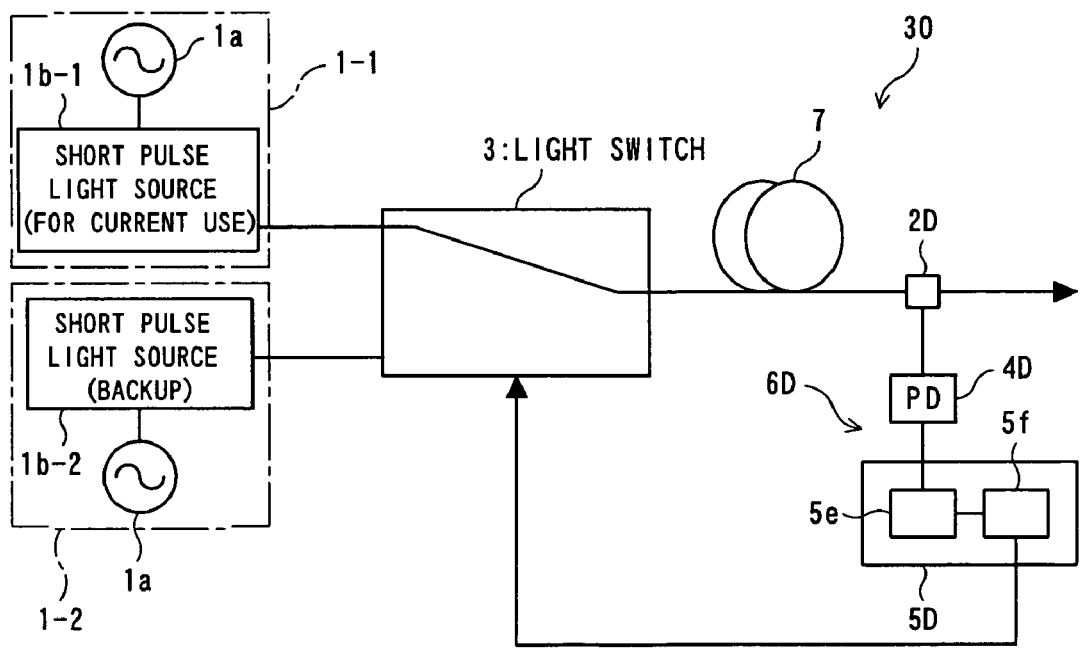
FIG. 13 is a block diagram showing a light source apparatus according to the third embodiment of the present invention.

FIG. 13 is a block diagram showing a light source apparatus 30 according to the third embodiment of the present invention. The light source apparatus 30 shown in FIG. 13 differs from the pieces of light source apparatus of the respective embodiments in that the light source apparatus has an optical switch control section 6D for controlling the optical switch 3. The light source apparatus 30 is identical with the pieces of light source apparatus of the respective embodiments in that the light source apparatus has the optical pulse train generation sections 1-1, 1-2, the optical switch 3, and the high nonlinear fiber 7.

Here, the optical switch control section 6D comprises a monitor wavelength filter 2D for extracting, as a monitor wavelength component, a specific wavelength component of the continuous light (SC light) which serves as output light generated by the high nonlinear fiber 7 and has a plurality of wavelengths; a photodiode 4D which is a photoelectric conversion element for converting, into an electrical signal, the monitor wavelength component extracted by the monitor wavelength filter 2D; and an electrical signal processing section 5D for controlling the optical switch 3 on the basis of the electrical signal output from the photodiode 4D.

The electrical signal processing section 5D comprises a status determination section 5e and the second control signal output section 5f. The status determination section 5e receives an electrical signal showing the monitor wavelength component output from the photodiode 4D and determines the status of the optical pulse train output for current use from the optical switch 3 on the basis of variations in the monitor wavelength component. Specifically, the status determination section 5e determines whether or not the monitor wavelength component output from the photodiode 4D has become smaller than a predetermined threshold value and output a result of determination.

When the status determination section 5e has determined that the status of the optical pulse train output from the optical switch 3 for current use is anomalous, the second control signal output section 5f outputs the second control signal to the optical switch 3 to switch the current optical pulse train output from the optical switch 3 to another optical pulse train without involvement of instantaneous interruption of power. For instance, in a case where the optical switch section 3 outputs, as a current optical pulse train, the optical pulse train generated by the optical pulse train generation section 1-1, when the second control signal is output to the optical switch section 3, the optical pulse train to be output is switched to the optical pulse train generated by the optical pulse train generation section 1-2.

By means of the foregoing configuration, even in the third embodiment, the high nonlinear fiber 7 generates CW light on the basis of the optical pulse train selected by the optical switch 3 from among the optical pulse trains generated by the optical pulse train generation sections 1-1, 1-2 and outputs the thus-generated CW light.

Figure 14:
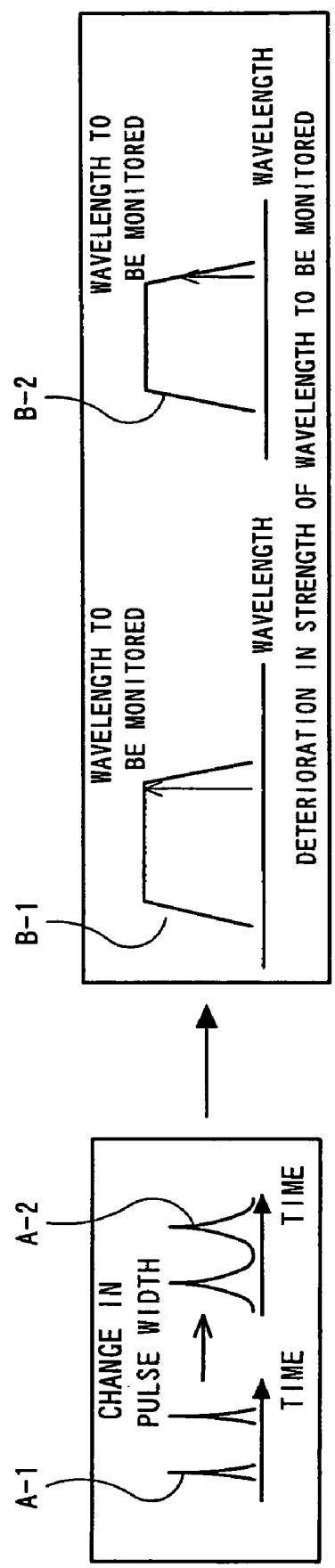
FIG. 14 is a view for describing operation of the third embodiment of the present invention.

At this time, the pulse to be input to the optical switch 3 has a narrow width, and difficulty is encountered in monitoring the width of the pulse in real time. However, as shown in FIGS. 14A-1, 14A-2, as a result of fluctuation of the pulse width, the band of the WDM signal generated by the high nonlinear fiber 7 undergoes a change, as shown in FIGS. 14B-1, 14B-2.

The status determination section 5e of the optical switch control section 6D monitors a wavelength component of the CW light output from the high nonlinear fiber 7, the component being susceptible to variations under influence of the width of the signal pulse and not used as a specific signal channel or a communications carrier.

When the second control signal output section 5f has detected an anomaly in the current optical pulse generation section (e.g., an optical pulse generation section 1-1) from a decrease in the intensity of the monitor wavelength components when compared with a threshold level, on the basis of the monitoring result output from the status determination section 5e, a signal for switching the optical switch 3 is sent to the optical switch 3 as the second control signal. Thereby, the optical switch section 3 switches the pulse train before the influence of a change in the pulse affects the signal channel, thereby realizing switching of the pulse train without involvement of instantaneous interruption of power.

As a result, the backup optical pulse train generation section 1-2 can be switched to a current optical pulse train generation section before the optical pulse train being output for current use is completely interrupted. Hence, the optical pulse train can be switched without involvement of instantaneous interruption of power.

As mentioned above, according to the third embodiment of the present invention, the current system can be switched to the backup system by means of the optical switch control section 6D through use of the light source apparatus 30 functioning as the SC light source. Therefore, in the event that a failure, or the like, has arisen in the optical pulse train generation section (e.g., the optical pulse train generation section 1-1) of the current system, the optical pulse train can be switched to the optical pulse train output from the optical pulse train generation section (the optical pulse train generation section 1-2) of the backup system without involvement of instantaneous interruption of power. As in the case of the first embodiment, there is also yielded an advantage of the ability to stably generate and output the continuous light which has a plurality of carriers and becomes output light.

The light source apparatus may have the timing extraction section 5b analogous to that described in connection with the first embodiment and output the second control signal at the timing of extinction extracted by the timing extraction section 5b.

[D] Others

Regardless of the previously-described respective embodiments, the present invention can be carried out by means of being modified variously within the scope of the gist of the invention.

For example, in the previously-described embodiments, the two optical pulse train generation sections 1-1, 1-2 are used, wherein one of the two optical pulse train generation sections is used for current use and the other is taken for backup. However, the present invention is not limited to such embodiments. Three or more optical pulse generation sections may be prepared, and a combination of the current optical pulse train generation section and the backup optical pulse train generation section may also be embodied as a combination of one or more current optical pulse train generation sections and one or more backup optical pulse train generation sections.

As a matter of course, the present invention can also be embodied as appropriate by combining features of the respective embodiments. For instance, it goes without saying that modifications of the first embodiment can also be combined with the second embodiment. Alternatively, the light source apparatus may assume the configuration described in connection with the second embodiment along with the optical switch control section 6D of the third embodiment.

Moreover, the apparatus of the present invention can be manufactured by means of the previously-described embodiments.

What is claimed is:

1. A light source apparatus comprising:
    a plurality of optical pulse train generation sections to generate periodic optical pulse trains in synchronism with each other;
    an optical switch section to selectively output an optical pulse train taken as an optical pulse train for current use from among said optical pulse trains output from said plurality of optical pulse trains generation sections;
    a light transformation section to transform said optical pulse train for current use into a continuous light having a plurality of wavelengths; and
    an optical switch control section to control said optical switch section in order to switch an output of said optical pulse train for current use from said optical switch section, in accordance with the states of respective optical pulse trains generated by said plurality of optical pulse train generation sections without involvement of instantaneous power interruption.

2. The light source apparatus according to claim 1, wherein said optical switch control section further comprises:
    photoelectric conversion sections to convert into electrical signals said optical pulse trains output from said plurality of optical pulse train generation sections, respectively,
    an anomaly detection section to detect anomalies in said respective optical pulse trains converted into electrical signals by said photoelectric conversion sections,
    a timing extraction section to extract extinction/illumination timings of the respective optical pulse trains converted into said electrical signals by said photoelectric conversion sections, and
    a first control signal output section which, when said anomaly detection section has detected anomalies in said optical pulse train for current use, outputs a first control signal to said optical switch section in order to switch said optical pulse train for current use, at an extinction timing extracted by said timing extraction section.

3. The light source apparatus according to claim 2, wherein each of said plurality of optical pulse train generation sections comprise:
    a clock signal generation section to generate a clock signal, and
    a pulse light source to output optical pulse trains on the basis of the clock signal generated by said clock signal generation section; and
    said light source apparatus further comprises a sync control section to synchronously control said clock signal generation sections of said respective pulse train generation sections on the basis of extinction/illumination timings of said respective optical pulse trains extracted by said timing extraction section.

4. The light source apparatus according to claim 2, further comprising:
    node sections, each of which respectively divides one of said optical pulse trains that are output from said plurality of optical pulse train generation sections into two branches and which guides one of said branches to said optical switch section and the other branch to said respective photoelectric conversion section, and
    a plurality of light delay circuits each of which is respectively interposed between said one of node section and said optical switch section, the light delay circuit delaying propagation of said respective optical pulse trains.

5. The light source apparatus according to claim 2, further comprising:
    node sections, each of which respectively divides one of said optical pulse trains that are output from said plurality of optical pulse train generation sections into two branches and which guides one of said branches to said optical switch section and the other branch to said photoelectric conversion section;
    light delay circuits, each being interposed between said corresponding node section and said optical switch section and which delays propagation of said respective optical pulse train; and
    chirp compensation circuits, each of which is interposed between said node section and said optical switch and which compensates for chirp.

6. The light source apparatus according to claim 1, wherein said optical switch section further comprises;
    first and second optical switches which are under control of said optical switch control section, receive optical pulse trains output from said plurality of optical pulse train generation sections, and selectively outputs said optical pulse train for current use from among the received optical pulse trains, and
    a switch-to-be-used changeover control section to control switching between said first optical switch and said second optical switch such that said first optical switch is used in normal times for selectively outputting said optical pulse train for current use and said second optical switch is used for selectively outputting another optical pulse train for current use during occurrence of anomalies in said optical pulse train for current use output from said first optical switch.

7. The optical light source apparatus according to claim 6, wherein said first and second optical switches each comprise:

a current optical pulse train output port to output said optical pulse train for current use from among said plurality of optical pulse trains, and a backup optical pulse train output port to output a backup output pulse train other than said optical pulse train for current use, for monitoring purpose; and wherein said switch-to-be-used changeover control section is configured to determine occurrence of anomalies in any one of said first and second optical switches by means of monitoring said backup output pulse train output from said backup optical pulse train output ports of said respective first and second optical switches.

8. The light source apparatus according to claim 6, wherein a light delay circuit is interposed between said first optical switch and said light transformation section for delaying propagation of an optical pulse train output from said first optical switch.

9. The light source apparatus according to claim 6, wherein a light delay circuit for delaying propagation of an optical pulse train output from said first optical switch and a chirp compensation circuit for effecting chirp compensation are interposed between said first optical switch and said light transformation section.

10. The light source apparatus according to claim 6, further comprising:

a light phase adjustment section to compensate for a difference between a time when respective optical pulse trains output from said plurality of optical pulse trains generation sections arrive at said first optical switch and a time when respective optical pulse trains output from said plurality of optical pulse trains generation sections arrive at said second optical switch.

11. The light source apparatus according to claim 1, wherein said optical switch control section comprises:

a status determination section to determine the status of said optical pulse train for current use output from said optical switch section, on the basis of variations in a specific wavelength component in said continuous light from said light transformation section, and a second control signal output section to output a second control signal to said optical switch in order to switch an output of said optical pulse train for current use from said optical switch section without involvement of instantaneous power interruption when said status determination section determines that the status of said optical pulse train for current use from said optical switch section is anomalous.

12. A method for redundant light source switching, the method comprising:

generating a plurality of periodic optical pulse trains in synchronism with each other;

monitoring status of each of said plurality of periodic optical pulse trains;

selectively outputting an optical pulse train taken as an optical pulse train for current use from among said periodic optical pulse trains, on a basis of the monitoring result; and transforming said outputted optical pulse train for current use into a continuous light including plurality of wavelengths, wherein selectively outputting the optical pulse train for current use comprises switching any one of said plurality of periodic optical pulse trains not having been employed for current use to an optical pulse train for current use at an extinction timing of the plurality of periodic optical pulse trains on the basis of the monitoring result, without involvement of instantaneous power interruption at the time of switching.

13. The method for redundant light source according claim 12, wherein in an event of occurrence of anomalies in said optical pulse train for current use, switching any one of said plurality of periodic optical pulse trains not having been employed for current use to an optical pulse train for current use.

14. A method for redundant light source switching, the method comprising:

monitoring a status of each of a plurality of periodic optical pulse trains;

switching one of the plurality of periodic optical pulse trains not being employed for current use to an optical pulse train for current use at an extinction timing of the plurality of periodic optical pulse trains on a basis of the monitoring, without involvement of instantaneous power interruption at the time of switching;

outputting the optical pulse train for current use; and transforming the outputted optical pulse train for current use into a continuous light including a plurality of wavelengths.

* * * * *